US005455685A

United States Patent [19]
Mori

[11] Patent Number: 5,455,685
[45] Date of Patent: Oct. 3, 1995

[54] VIDEO CAMERA EXPOSURE CONTROL APPARATUS FOR CONTROLLING IRIS DIAPHRAGM AND AUTOMATIC GAIN CONTROL OPERATING SPEED

[75] Inventor: Yoshihiko Mori, Tokyo, Japan

[73] Assignee: Fuji Photo Film Co., Ltd., Kanagawa, Japan

[21] Appl. No.: 937,414

[22] Filed: Aug. 31, 1992

[30] Foreign Application Priority Data

Sep. 4, 1991 [JP] Japan .................................. 3-224354

[51] Int. Cl.$^6$ .................................................. H04N 5/238
[52] U.S. Cl. .......................... 348/363; 348/230; 348/364; 348/366
[58] Field of Search .............................. 358/213.19, 218, 358/219, 227, 228, 174; 348/362, 363, 364, 370, 221, 222, 223, 224, 226, 229, 230; H04N 5/335, 5/232, 5/238

[56] References Cited

U.S. PATENT DOCUMENTS

| | | | |
|---|---|---|---|
| 4,918,538 | 4/1990 | Saito et al. | 358/335 |
| 4,959,727 | 9/1990 | Imaide et al. | 358/228 |
| 4,969,045 | 11/1990 | Haruki et al. | 358/228 |
| 5,049,997 | 9/1991 | Arai | 358/213.11 |
| 5,128,769 | 7/1992 | Arai et al. | 348/363 |
| 5,210,566 | 5/1993 | Nishida | 354/402 |
| 5,343,246 | 8/1994 | Arai et al. | 348/363 |
| 5,386,231 | 1/1995 | Shimizu et al. | 348/296 |

*Primary Examiner*—Michael T. Razavi
*Assistant Examiner*—Ngoc-Yen Vu

[57] ABSTRACT

Disclosed is an exposure control device for a video camera having automatic gain control by which both stability and instantaneous regulation of exposure can be satisfied in accordance with a photographing scene. The exposure control device for the video camera has an iris diaphragm control which receives an electric signal output an image sensor through a preamplifier as an iris diaphragm detection signal and which controls the iris diaphragm based on the iris diaphragm detection signal. An automatic gain control circuit receives an electric signal output from an automatic gain control amplifier disposed subsequent a preamplifier as an automatic gain control detection signal and controls the gain of the automatic gain control amplifier based on the automatic gain control detection signal. A determination circuit determines the various states of a photographing scene based on a change of an electric signal output the image sensor caused by lapse of time. An operating speed control circuit simultaneously increases or decreases the respective operating speeds of the iris diaphragm control and the automatic gain control based on the state of the photographing scene determined by the determination circuit.

22 Claims, 4 Drawing Sheets

VIDEO CAMERA EXPOSURE CONTROL APPARATUS FOR CONTROLLING IRIS DIAPHRAGM AND AUTOMATIC GAIN CONTROL OPERATING SPEED

BACKGROUND OF THE INVENTION

1. Field of the Invention

The present invention relates to an exposure control device for a video camera, and more specifically, to an exposure control device for a video camera which has two kinds of sensitivity control functions for controlling an iris diaphragm and an automatic gain controller AGC.

2. Description of the Background Art

Recently, there has been proposed an exposure control device for a video camera by which the operating speed of an iris diaphragm can be changed in accordance with a photographing scene (Japanese Patent Application No.1-184951).

When a photographing scene is continuous or when a main subject is located at the central portion of a picture and only a background is moved, an exposure control device for a video camera decreases the operating speed of an iris diaphragm so that an amount of exposure of the main subject is not exceptionally changed.

Incidentally, the iris diaphragm of a conventional video camera has an automatic gain controller (AGC) disposed to in a subsequent stage thereof and an operating speed (gain control speed) of the AGC is fixed.

Therefore, a problem arises in that even if the operating speed of the iris diaphragm is changed in accordance with a photographing scene as in the case of the above exposure control device for a video camera, the change of brightness of a pictorial image finally depends upon the operating speed of the AGC, and the speed at which the brightness of the pictorial image is changed cannot be adjusted even if only the operating speed of the iris diaphragm is changed.

SUMMARY OF THE INVENTION

Taking the above into consideration, an object of the present invention is to provide an exposure control device for a video camera capable of satisfying both stability and conformity of an exposure and gain control in accordance with a photographing scene in a video camera having an AGC.

To achieve the above object, the present invention provides an exposure control device for a video camera which obtains a necessary video signal by converting a light from a subject, incident on an image sensor through a taking lens and iris diaphragm, to an electric signal. The image sensor outputs the electric signal to a video processing circuit, through a preamplifier and an AGC amplifier for suitably processing the electric signal. The video processing circuit comprises an iris diaphragm control means for receiving an electric signal output from the preamplifier as an iris diaphragm detection signal and for controlling the iris diaphragm based on the iris diaphragm detection signal. An AGC means is included for receiving an electric signal output from the AGC amplifier as an AGC detection signal and for controlling the gain of the AGC amplifier based on the AGC detection signal. A determination means is included for determining the various kinds of states of a photographing scene based on a change of an electric signal corresponding to the image of the subject caused by the lapse of time and an operating speed control means is included for simultaneously increasing or decreasing the respective operating speed of the iris diaphragm control means and AGC means based on the state of the photographing scene determined by the determination means.

According to the present invention, the various kinds of states of the photographing scene are determined based on the change of the electric signal corresponding showing the image of the subject caused by the lapse of time. More specifically, whether a photographing scene is continuous, a main subject is continuous even if a background moves, or the like is determined. Then, when the photographing scene is continuous, the respective operating speeds of the iris diaphragm control means and AGC means are simultaneously decreased to thereby stably regulate an exposure and gain for the photographing scene, whereas when the photographing scene is not continuous such as in the case that the photographing scene is changed, the respective operating speeds of the iris diaphragm control means and AGC means are simultaneously increased to thereby instantaneously regulate the exposure and gain for the photographing scene.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The exact nature of this invention, as well as other objects and advantages thereof, will be readily apparent from consideration of the following specification relating to the accompanying drawings, which are given by way of illustration only and thus are not limitative of the present invention and in which like reference characters designate the same or similar parts throughout the figures thereof, wherein.

DESCRIPTION OF THE PREFERRED EMBODIMENT

A detailed description will hereunder be given of a preferred embodiment of an exposure control device for a video camera according to the present invention with reference to the accompanying drawings.

Figure 1:
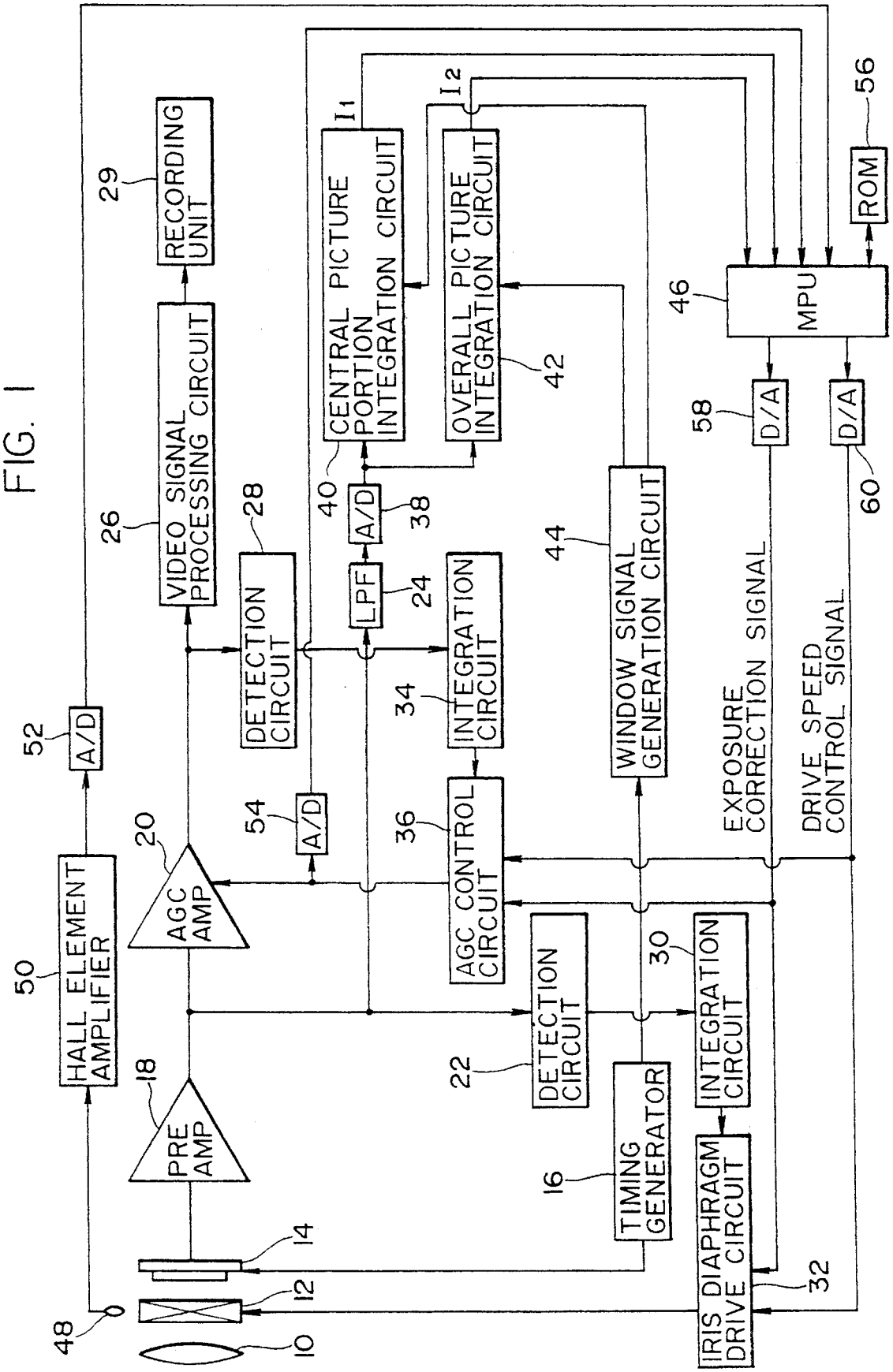
FIG. 1 is a block diagram of a video camera including an embodiment of an exposure control device for a video camera according to the present invention.

FIG. 1 is a block diagram of the video camera including an embodiment of the exposure control device for the video camera according to the present invention.

In FIG. 1, a light from a subject is focused on the light receiving surface of a camera element (CCD) 14 through a taking lens 10 and iris diaphragm 12. The CCD 14 accumulates the incident light as charges and reads the accumulated charge in synchronism with a timing pulse applied from a timing generator 16. An electric signal read from the CCD 14 as described above is amplified by a preamplifier 18 and then applied to an AGC amplifier 20, detection circuit 22 and low pass filter (LPF) 24.

The AGC amplifier 20 is supplied with an AGC gain control signal to be described later and amplifies the above electric signal by a gain controlled by the AGC gain control signal and outputs the electric signal to a video signal processing circuit 26 and detection circuit 28.

The video signal processing circuit 26 includes a white balance circuit a γ correction circuit, a matrix circuit, an encoder circuit and the like. The video signal processing circuit 26 performs a predetermined signal processing by these circuits and then outputs a video signal of, for example, the NTSC system to a recording unit 29. The recording unit 29 including a recording circuit converts the above video signal to a recording signal suitable for magnetic recording and then magnetically records the recording signal on a recording medium such as a video tape or the like through a magnetic head.

On the other hand, the detection circuit 22 receiving the electric signal output from the preamplifier 18 detects the input electric signal and outputs the same to an integration circuit 30, which integrates a field of the input signal and outputs a thus obtained integration value to an iris diaphragm drive circuit 32 as an average measured light value.

The iris diaphragm drive circuit 32 preset with an iris diaphragm reference value compares the iris diaphragm reference value with the above average measured light value. When the average measured light value is greater than the iris diaphragm reference value, the iris diaphragm drive circuit 32 determines that it is too bright and drives the iris diaphragm 12 in a closing direction, whereas when the average measured light value is less than the iris diaphragm reference value, the iris diaphragm drive circuit 32 determines that it is too dark and drives the iris diaphragm 12 in an opening direction.

In the same way, the detection circuit 28 receiving the electric signal output from the AGC amplifier 20 detects the input electric signal and outputs the same to an integration circuit 34, which integrates a field of the input signal and outputs a thus obtained integration value as an average value of the electric signal output AGC amplifier 20 to an AGC control circuit 36.

The AGC control circuit 36 preset with an AGC reference value compares the AGC reference value with the above integration value. When the integration value is greater than the AGC reference value, the AGC control circuit 36 determines that it is too bright and outputs an AGC gain control signal to the AGC amplifier 20 to lower the gain of the AGC amplifier 20, whereas when the integration value is less than the AGC reference value, the AGC control circuit 36 determines that it is too dark and outputs an AGC gain control signal to the AGC amplifier 20 to increase the gain of the AGC amplifier 20.

Note that an exposure correction signal and drive speed control signal are applied to the iris diaphragm drive circuit 32 and the AGC control circuit 36, respectively, and the above iris diaphragm reference value and AGC reference value are corrected by these signals. The operating speeds of the iris diaphragm drive circuit 32 and AGC control circuit 36 are also controlled by these signals, the detail of which will be described later.

The low pass filter 24 receiving the electric signal output from the preamplifier 18 detects the input electric signal to obtain a signal corresponding to a luminance signal. An A/D converter 38 converts the luminance signal passing through the low pass filter 24 to a digital signal and outputs the converted luminance data to a central picture portion integration circuit 40 and overall picture integration circuit 42.

A window signal is supplied to the central picture portion integration circuit 40 from a window signal generation circuit 44 to indicate the timing at which the luminance data of the central picture portion in a single field (the range surrounded by a dotted line in FIG. 2) is output. The central picture portion integration circuit 40 integrates only the luminance data at the central picture portion of a single field of input luminance data in response to the window signal and outputs central portion average luminance data $I_1$ obtained by dividing the integrated data by the area surrounded by the dotted line in FIG. 2 to a microprocessor unit (MPU) 46.

In the same way, a window signal is supplied to the overall picture integration circuit 42 from the window signal generation circuit 44 to indicate the timing at which luminance data of substantially the overall picture (the range surrounded by a dot-dash line in FIG. 2) is output. The overall picture integration circuit 42 integrates substantially a single field of input luminance data in response to the window signal and outputs overall portion average luminance data $I_2$ obtained by dividing the integrated data by the area surrounded by the dot-dash line in FIG. 2 to the MPU 46.

In addition to the above inputs, the MPU 46 is supplied with a signal corresponding to a degree of opening of the iris diaphragm 12 output from a Hall element 48 through a Hall element amplifier 50 and A/D converter 52 as a degree of opening data of the iris diaphragm 12 as well as an AGC gain control signal output from AGC control circuit 36 through an A/D converter 54 as AGC gain data.

The MPU 46 processes the luminance data $I_1$ and $I_2$, degree of opening data of the iris diaphragm 12 and AGC gain data input thereto based on a program stored in a read only memory (ROM) 56 and a look up table to be described later and outputs an exposure correction signal and drive speed control signal, respectively, through D/A converters 58 and 60.

More specifically, the MPU 46 first determines a logarithm of the ratio of the central portion average luminance data $I_1$ and overall portion average luminance data $I_2$ $$D=\log (I_1/I_2).$$

Further, the MPU 46 calculates the logarithm of the absolute value of brightness of the subject from the degree of opening of the iris diaphragm 12 and the AGC gain data.

Figure 3:
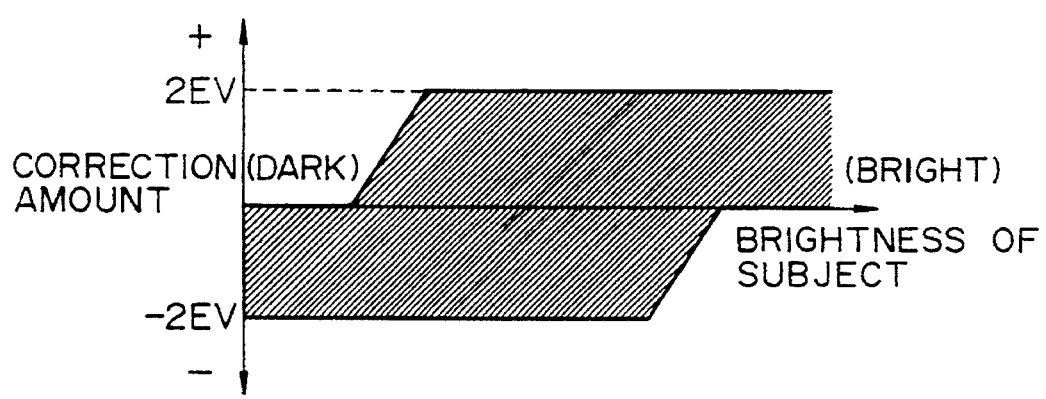
FIG. 3 is a graph showing a range of the amount of exposure to be corrected to the brightness of a subject.

Then, when the absolute value |D| exceeds a threshold value $Th_D$, the MPU 46 creates an exposure correction signal based on the luminance data $I_1$ so that a center-weighted measuring mode (an exposure control mode for emphasizing on the central picture portion) is employed and outputs the exposure correction signal to the iris diaphragm drive circuit 32 and AGC control circuit 36 through the D/A converter 58. Note that the above exposure correction signal is regulated so that a correction amount of exposure is within a range shown in FIG. 3 in accordance with the above calculated brightness of the subject. More specifically, as shown in FIG. 3, when the brightness of the subject is increased, a correction amount of a spot light (a negative correction amount) to an average measured light value is decreased, whereas when the brightness of the subject is decreased, a correction amount of a rear light (a positive correction amount) to the average measured light value is decreased.

With this arrangement, when a distribution of luminance in the picture of the subject includes a rear light or is illuminated by a spot light, an amount of exposure is corrected so that the central portion of the picture is properly exposed. However, an amount of correction is decreased for an abnormal light having an extreme brightness to prevent a too bright state. On the contrary, when an extreme dark subject is photographed, the surroundings of the subject are prevented from being made excessively bright due to an excessive correction of a rear light.

Note, when a correction amount is decreased as described above, it is changed to be gradually decreased in accordance with the brightness of a subject to thereby obtain a natural pictorial image in which an exposure is not abruptly changed. Further, when $|D| \leq Th_D$, an average measured light is obtained and thus an exposure correction signal has a standard value.

The MPU 46 executes the above exposure correction and further compares the central portion average luminance data $I_1$ before and after a predetermined period of time and overall portion average luminance data $I_2$ before and after the predetermined period of time, respectively to determine how a photographed scene is changed before and after the predetermined period of time.

Figure 4:
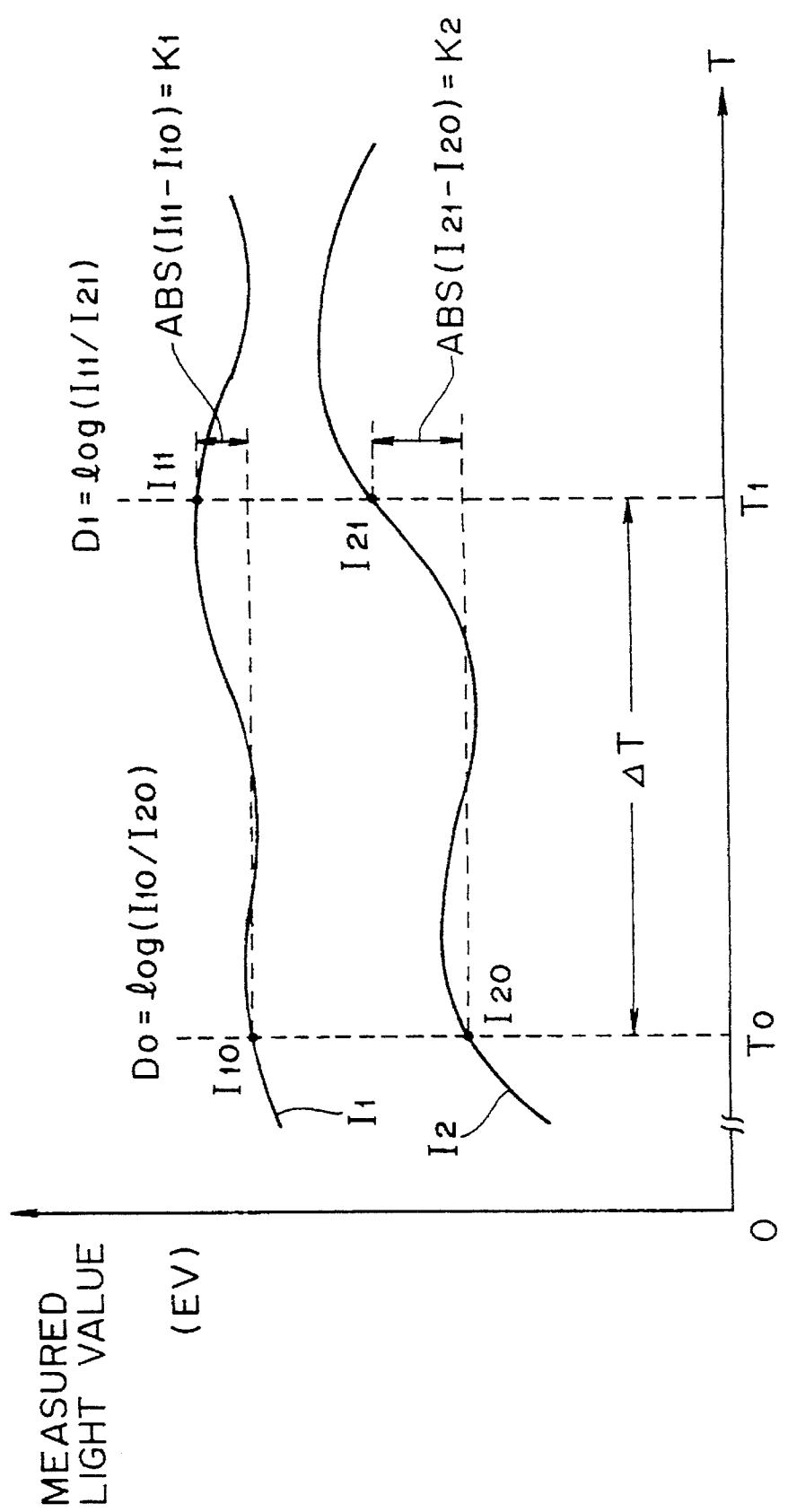
FIG. 4 is a graph showing an example of the variation of measured light values in respective light measuring regions.

More specifically, as shown in FIG. 4, when the central portion average luminance data $I_1$ and overall portion average luminance data $I_2$ at a time $T_o$ are represented by $I_{10}$ and $I_{20}$, respectively, and those at a time $T_1$ after a period of time $\Delta T$ are represented by $I_{11}$ and $I_{21}$, respectively, and a symbol of an absolute value is represented by ABS, the following values are determined.

$$K_1 = ABS(I_{11} - I_{10})$$

$$K_2 = ABS(I_{21} - I_{20})$$

The thus determined values are compared with the respective threshold values $Th_1$ and $Th_2$ thereof. Then, the result of the comparisons is classified as shown in Table 1.

TABLE 1

| | $K_1 \leq Th_1$<br>$K_2 > Th_2$ | $K_1 > Th_1$<br>$K_2 \leq Th_2$ | $K_1 > Th_1$<br>$K_2 > Th_2$ | $K_1 \leq Th_1$<br>$K_2 \leq Th_2$ |
|---|---|---|---|---|
| $\|D_o\| > Th_D$ | Condition ① | Condition ② A<br>Condition ② B | Condition ③ | Condition ④ |
| $\|D_o\| \leq Th_D$ | Condition ⑤ | Condition ⑥ | Condition ⑦ | Condition ⑧ |

Note, the case of $|D_0| > Th_D$, corresponds to that an exposure control which is executed by the center-weighted measurement at the time of $T_0$ and the case of $|D_0| \leq Th_D$ corresponds to an exposure control is executed by the average light measurement. Further, Table 1 is stored in the ROM 56 as a look up table.

When these condition ①–⑧ are caused to correspond to the actual photographing scenes before and after the period of the time $\Delta T$, the following states can be assumed:

Condition ① . . . only a background is changed;

Condition ② . . . a main subject is moved;

Condition ③ . . . changeover of a photographing scene;

Condition ④ . . . almost no change is has occured;

Condition ⑤ . . . only a background is changed;

Condition ⑥ . . . a main subject is moved to the central portion of a picture;

Condition ⑦ . . . changeover of photographing scene; and

Condition ⑧ . . . almost no change has occured.

Note that when the condition ② is further classified, a condition ②A is achieved when "$|D_1| > |D_0|$" and a condition ②B is achieved when "$|D_1| \leq |D_0|$", and in the condition ②A, a scene in which a main subject is moved to the central portion of a picture, for example, is assumed.

The MPU 46 executes the aforesaid arithmetic operations and then determines the states of the photographing subject before and after the period of time of $\Delta T$ and changes the operation speed of an exposure/gain control. More specifically, when it is determined that a photographing scene satisfies the condition ①, ②B, ④, ⑤, ⑥ or ⑧, the MPU 46 outputs a drive speed control signal to the iris diaphragm drive circuit 32 and AGC control circuit 36, respectively, through the D/A converter 60 to decrease the operating speeds of the iris diaphragm 12 and AGC amplifier 20 and when it is determined that a photographing scene satisfies the condition ②A, ③ or ⑦, a drive speed control signal to increase the operating speeds of the iris diaphragm 12 and AGC amplifier 20 in the same way. Note that the above drive speed control signal is such a signal as to instruct a movement of some EVs per second and, for example, the operating speed is fast at a speed of 10 EV/sec. and slow at a speed of 0.5 EV/sec.

Figure 5:
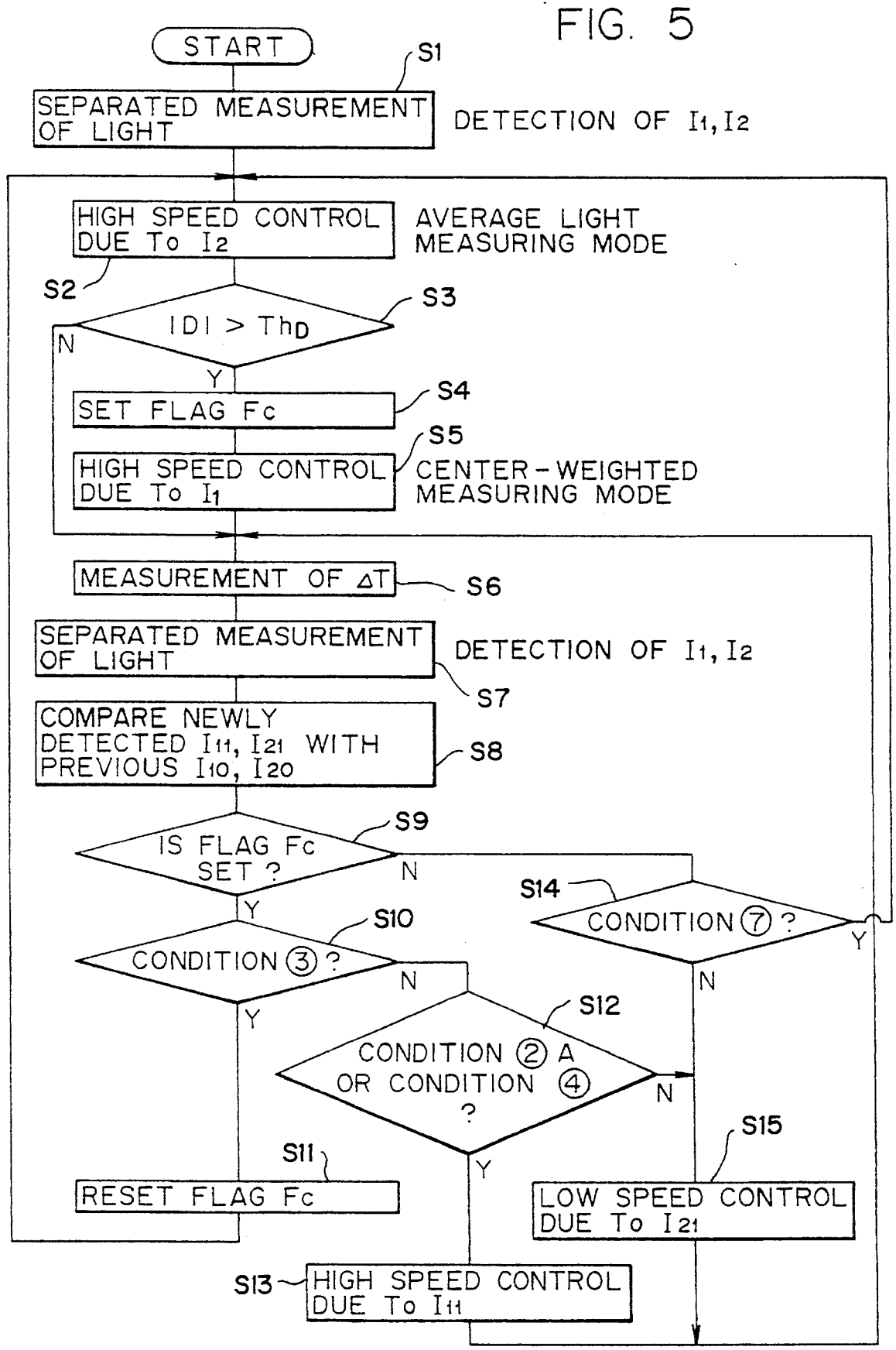
FIG. 5 is a flowchart for explaining the operation of the embodiment shown in FIG. 1.

The operation of the exposure control device for a video camera arranged as described above will be explained with reference to FIG. 5.

In step S1 the exposure/gain control is initiated at the start of the recording of a picture and at the same time the central portion average luminance data $I_1$ and overall portion average luminance data $I_2$ are separately measured. Then, in step S2 an exposure/gain control is first executed by an average measured light based on the overall portion average luminance data $I_2$. At this time, the MPU 46 does not output an exposure correction signal and thus the CCD 14 is regulated to receive a fixed amount of light as a whole. Further, at this time, the MPU 46 outputs a high speed signal as a drive speed control signal. As described above, when the recording of the picture is started, an extreme amount of over and under exposure of a main subject can be prevented by instantaneously executing an exposure/gain control based on an average light measuring mode.

Subsequently, in steps S3, a value of D is calculated and compared with a value of $Th_D$. When "$|D| > Th_D$", the central portion average luminance data $I_1$ is greatly different from the overall portion average luminance data $I_2$. Thus, if the exposure is continuously controlled based on the average light measuring mode, the main subject is liable to have an improper amount of exposure because there is a high probability that the main subject is located at the central portion of the picture. Therefore, when "$|D| > Th_D$" is determined, a flag $F_c$ is set in step S4 to indicate that the average light measuring mode is changed to a center-weighted measuring mode. MPU 46 outputs in step S5 an exposure correction signal in accordance with the central portion average luminance data $I_1$ through the D/A converter 58 and also outputs a drive speed control signal through the D/A converter 60 to increase an operating speed. Note, when "$|D| < Th_D$", the average light measuring mode is maintained as it is.

After the execution of the above exposure/gain control, a light is again measured separately in step S7 after a period of time $\Delta T$ has been measured in step S6. A and a new central portion average luminance data $I_{11}$ and overall portion average luminance data $I_{21}$ are detected as shown in FIG. 4 in correspondence to the central portion average luminance data $I_{10}$ and overall portion average luminance data $I_{20}$ obtained by the previous separate light measurement. Then, values of $K_1$ and $K_2$ are determined from the absolute value of the difference of the respective luminance data. These values of $K_1$ and $K_2$ are compared with the threshold values $Th_1$ and $Th_2$, respectively, and classified in accordance to Table 1. Further, it is also possible that the above period of time $\Delta T$ is caused to coincide with the field reading. cycle of the CCD 14 and at this time an additional timer is not necessary to measure $\Delta T$.

When the values of $K_1$ and $K_2$ are determined as described above, the states of photographing scenes are determined before and after the lapse of the period of time of $\Delta T$. When the condition ③ is satisfied in step 10, that is, when both the central portion average luminance data $I_1$ and overall portion average luminance data $I_2$ are greatly changed when in the center-weighted measuring mode determined at step S9, it is determined that a photographing scene is greatly changed by, for example, a large amount of panning of a video camera, or the like. Thus, the center-weighted measuring mode is canceled in step S11 and then an exposure/gain control is restarted to a new scene by using the average light measuring mode.

Further, when only the central portion average luminance data $I_1$ is greatly changed and almost change occurs to the overall portion average luminance data $I_2$ and further the condition of $|D_1|>|D_0|$ is achieved as determined in step S12, a main subject being photographed in a rear light is, for example, moved to the central portion of the picture. In this case, the exposure/gain control is executed at a high speed based on a newly sensed central portion average luminance data $I_{11}$ in step S13 while maintaining the center-weighted measuring mode. Note, when almost no change occurs to both central portion average luminance data $I_1$ and overall portion average luminance data $I_2$, the same scene is continuously photographed in a similar distribution of luminance and thus it is only necessary that the center-weighted measuring mode is continuously employed as it is and the exposure/gain control is also executed at the high speed.

Figure 2:
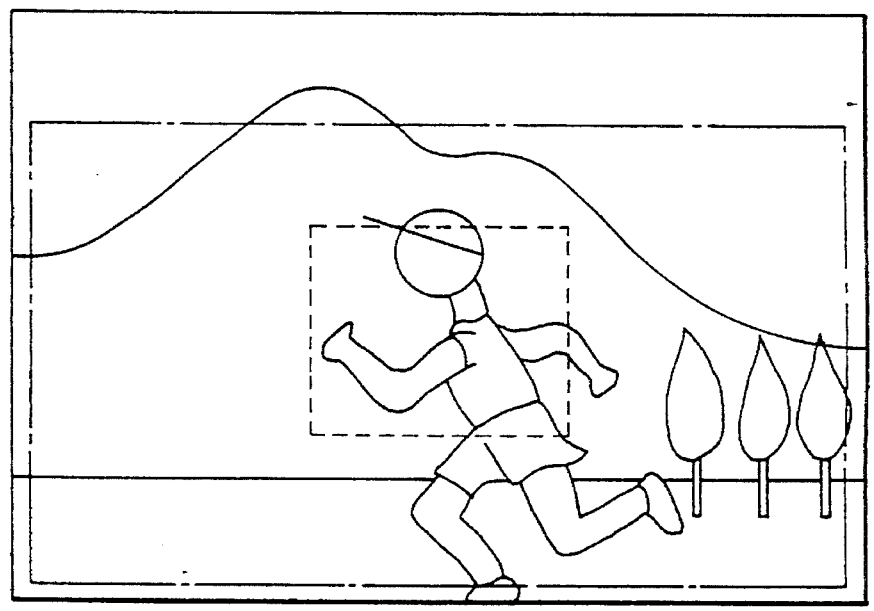
FIG. 2 is a diagram explaining an example of the picture of a subject.

When the condition of ②A and ③ are satisfied in the center-weighted measuring mode or when the conditions except the condition ⑦ are satisfied in the average light measuring mode in step S14, it is determined that a main subject is being moved in the picture of the subject shown in FIG. 2 or only the luminance of a back ground is changed by panning the video camera in accordance with the movement of the main subject. In these cases, the MPU 46 outputs a drive speed control signal through the D/A converter 60 in step S15 to decrease the operating speed of the exposure/gain control, whereby both the iris diaphragm drive circuit 32 and AGC control circuit 36 are slowly operated and thus the amount of exposure of the main subject also is not abruptly changed.

When it is determined that a photographing scene is continuous as described above, the amount of exposure of a main subject is stabilized by decreasing the operating. speed of the exposure/gain control rather than by executing the exposure/gain control at a high speed following to the change of luminance of a background. The photographing of 10 the background is of course scarified to some degree by 11 executing such a control, but when an image in a continuous scene is reproduced, a natural pictorial image can be obtained by stabilizing the exposure of the main subject.

Note that a method of determining the continuity of a photographing scene is not limited to the above embodiment and it also can be determined based on the space frequency component in a luminance signal. For example, the continuity of the photographing scene can be determined in such a manner that when a video camera is focused on a subject, a band pass filter (BPF) having a pass band width of 600 KHz ~2.4 MHz, which is the space frequency component of a general subject, is used in place of the low pass filter in FIG. 1 and data output from the central picture portion integration circuit 40 at this time is used. More specifically, an automatic focusing unit mounted to a video camera employs an area similar to the area surrounded by a dotted line at the central portion of the picture shown in FIG. 2 as a distance measuring area and thus the taking lens 10 is focused on this area. Since the BPF permits the space frequency component which is increased when the lens is focused to be passed therethrough, data output from the central picture portion integration circuit 40 is an integrated value of the space frequency component in the focused area.

As described above, when the integrated values before and after the period of time $\Delta T$ are compared and a large variation results from the comparison, it can be assumed that the distance of a subject to be measured is changed, i.e. a main subject is in a different state. It is only necessary that the operation speed of the exposure/gain control is increased at this time and that when the integrated value of the space frequency component is not so changed, the operating speed of the exposure/gain control is decreased.

Further, when the picture angle of the lens 10 is represented by $\theta$, the length in one direction of the main subject in the picture of a subject is represented by L and a distance from the taking lens 10 to the main subject is represented by X, a relationship expressed by the following formula is established.

$$L \propto 1/(\tan \theta \cdot X)$$

As the value L can be handled as a variable, when a value L before the period of time T is compared with a value L after the period of time T and a difference therebetween exceeds a predetermined range, it also can be assumed that a scene has been changed.

Note, even if a video camera itself is kept in the same attitude, a distribution of luminance in a picture may be changed by zooming. In this case, it is natural to determine that a scene has been substantially changed and thus it is preferable to increase the operating speed of the exposure/gain control. At this time, the change of the scene can be determined by detecting an amount of change of the zooming position of the taking lens 10 caused by a lapse of time.

The exposure control device for a video camera according to the present invention is not limited to a video camera and 13 also applicable to an electronic still video camera.

As described above, according to an exposure control device for a video camera of the present invention, whether a main subject is continuous or a main subject is continuous even if a background moves, and the like are determined and when the subject is continuous, the operation speeds of the iris diaphragm control means and AGC means are simultaneously decreased and thus an exposure/gain control can be stably regulated for a photographing scene. On the other hand, when there is no continuity in a photographic scene such as when a photographing scene is changed, the operating speeds of the iris diaphragm means and AGC means are simultaneously increased and thus the exposure/gain control can be instantaneously regulated for the photographing scene. That is, both stability and instantaneousness of an exposure and gain regulation can be satisfied in accordance with a photographing scene.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. An exposure control apparatus for a video camera which generates a video signal by converting a light incident on an image sensor from a subject through a taking lens and an iris diaphragm to an electric signal and outputting the electric signal to a video processing circuit through a preamplifier and an AGC amplifier for processing the electric signal, the exposure control apparatus comprising:

iris diaphragm control means, coupled to an electric signal output from said preamplifier as an iris diaphragm detection signal, for controlling said iris diaphragm based on said iris diaphragm detection signal;

AGC means, coupled to an electric signal output from said AGC amplifier as an AGC detection signal, for controlling gain of said AGC amplifier based on said AGC detection signal;

determination means, operatively coupled to the electric signal output from said preamplifier, for determining the states of a photographing scene based on a change of an electric signal corresponding to an image of said subject over a lapse of time; and operating speed control means for simultaneously controlling said iris diaphragm control means and said AGC means to selectively increase or decrease the respective operating speed of said iris diaphragm and said AGC amplifier based on the states of the photographing scene determined by said determination means, wherein said determination means determines whether the photographing scene or said subject are in one of a continuous state or a discontinuous state based on a change over the lapse of time of respective electric signals corresponding to at least two different areas including a central portion of the image of said subject, and said operating speed control means simultaneously controls said iris diaphragm control means and said AGC means to decrease the respective operating speeds of said iris diaphragm and said AGC amplifier when it is determined that the photographing scene or said subject is in the continuous state and to increase the respective operating speeds of said iris diaphragm and said AGC amplifier when it is determined that the photographing scene or said subject is in the discontinuous state.

2. The exposure control apparatus for a video camera according to claim 1, wherein said iris diaphragm control means comprises:

first averaging means for determining an average value of said iris diaphragm detection signal; and iris diaphragm drive means for driving said iris diaphragm so that said average value of said iris diaphragm detection signal coincides with a preset iris diaphragm reference value.

3. The exposure control apparatus for a video camera according to claim 2, wherein said AGC means comprises:

second averaging means for determining an average value of said AGC detection signal; and AGC amplifier drive means for controlling the gain of said AGC amplifier so that said average value of said AGC detection signal coincides with a preset AGC reference value.

4. The exposure control apparatus for a video camera according to claim 3, wherein said determination means further comprises control means for determining whether one of a center-weighted measuring mode or an averaged light measuring mode is to be employed based on ratios of respective electric signals output from said preamplifier corresponding to at least two different areas including an area of a central portion of the image of said subject and for outputting an exposure correction signal for correcting said preset iris diaphragm reference value and said preset AGC reference value based on the electric signals output from said preamplifier corresponding to said area of the central portion when said center-weighted measuring mode is employed.

5. The exposure control apparatus for a video camera according to claim 4, comprising:

brightness detection means for detecting the brightness of said subject; and restricting means for decreasing a correction amount of a spot light in said exposure correction signal when the brightness of said subject detected by said detection means is increased and for decreasing a correction amount of a rear light in said exposure correction signal when the brightness of said subject is decreased.

6. The exposure control apparatus for a video camera according to claim 1, wherein said determination means further comprises control means for determining whether one of a center-weighted measuring mode or an averaged light measuring mode is to be employed based on a change over the lapse of time of the respective electric signals corresponding to the at least two different areas including the central portion of the image of said subject and for determining whether said subject leaves or enters the central portion of the image when the center-weighted measuring mode is employed, said operating speed control means simultaneously controlling said iris diaphragm control means and said AGC means to decrease the respective operating speeds of said iris diaphragm and said AGC amplifier when it is determined that said subject leaves the central portion of the image in the center-weighted measuring mode and to increase the respective operating speeds of said iris diaphragm and said AGC amplifier when it is determined that said subject enters the central portion of the image in the center-weighted measuring mode.

7. An exposure control apparatus for a video camera which generates a video signal by converting a light incident on an image sensor from a subject through a taking lens and an iris diaphragm to an electric signal and outputting the electric signal to a video processing circuit through a preamplifier and an AGC amplifier for processing the electric signal, the exposure control apparatus comprising:

iris diaphragm control means, coupled to an electric signal output from said preamplifier as an iris diaphragm detection signal, for controlling said iris diaphragm based on said iris diaphragm detection signal;

AGC means, coupled to an electric signal output from said AGC amplifier as an AGC detection signal, for controlling gain of said AGC amplifier based on said AGC detection signal;

determination means, operatively coupled to the electric signal output from said preamplifier, for determining the states of a photographing scene based on a change of an electric signal corresponding to an image of said subject over a lapse of time; and operating speed control means for simultaneously controlling said iris diaphragm control means and said AGC means to selectively increase or decrease the respective operating speed of said iris diaphragm and said AGC amplifier based on the states of the photographing scene determined by said determination means, wherein said determination means determines a change of variation of an evaluation value, indicative of a focusing state, obtained from an area of a central portion of the image of said subject, and said operating speed control means simultaneously controls said iris diaphragm control means and said AGC means to decrease the respective operating speeds of said iris diaphragm and said AGC amplifier when said evaluation value is changed within a predetermined range and to increase the respective operating speeds of said iris diaphragm and said AGC amplifier when said evaluation value is changed exceeding the predetermined range.

8. An exposure control apparatus for a video camera which generates a video signal by converting a light incident on an image sensor from a subject through a taking lens and an iris diaphragm to an electric signal and outputting the electric signal to a video processing circuit through a preamplifier and an AGC amplifier for processing the electric signal, the exposure control apparatus comprising:

iris diaphragm control means, coupled to an electric signal output from said preamplifier as an iris diaphragm detection signal, for controlling said iris diaphragm based on said iris diaphragm detection signal;

AGC means, coupled to an electric signal output from said AGC amplifier as an AGC detection signal, for controlling gain of said AGC amplifier based on said AGC detection signal;

determination means, operatively coupled to the electric signal output from said preamplifier, for determining the states of a photographing scene based on a change of an electric signal corresponding to an image of said subject over a lapse of time; and operating speed control means for simultaneously controlling said iris diaphragm control means and said AGC means to selectively increase or decrease the respective operating speed of said iris diaphragm and said AGC amplifier based on the states of the photographing scene determined by said determination means, wherein said determination means determines the change of size of said subject in the image and said operating speed control means simultaneously controls said iris diaphragm control means and said AGC means to decrease the respective operating speeds of said iris diaphragm and said AGC amplifier when the size of said subject is changed within a predetermined range and to increase the respective operating speeds of said iris diaphragm and said AGC amplifier when the size of said subject is changed exceeding the predetermined range.

9. An exposure control apparatus for a video camera which generates a video signal by converting a light incident on an image sensor from a subject through a taking lens and an iris diaphragm to an electric signal and outputting the electric signal to a video processing circuit through a preamplifier and an AGC amplifier for processing the electric signal, the exposure control apparatus comprising:

iris diaphragm control means, coupled to an electric signal output from said preamplifier as an iris diaphragm detection signal, for controlling said iris diaphragm based on said iris diaphragm detection signal;

AGC means, coupled to an electric signal output from said AGC amplifier as an AGC detection signal, for controlling gain of said AGC amplifier based on said AGC detection signal;

determination means, operatively coupled to the electric signal output from said preamplifier, for determining the states of a photographing scene based on a change of an electric signal corresponding to an image of said subject over a lapse of time; and operating speed control means for simultaneously controlling said iris diaphragm control means and said AGC means to selectively increase or decrease the respective operating speed of said iris diaphragm and said AGC amplifier based on the states of the photographing scene determined by said determination means, wherein said determination means determines a state of change of a focusing distance of said taking lens and when said focusing distance is changed within a predetermined range, said operating speed control means simultaneously controls said iris diaphragm control means and said AGC means to decrease the respective operating speeds of said iris diaphragm and said AGC amplifier and when said focusing distance is changed exceeding the predetermined range, said operating speed control means simultaneously controls said iris diaphragm control means and said AGC means to increase the respective operating speeds of said iris diaphragm and said AGC amplifier.

10. A method of controlling exposure of a video camera including an image sensor for imaging light from a subject incident upon the image sensor through a taking lens and an iris diaphragm, an electrical signal output from the image sensor being supplied to video processing means via a preamplifier and an AGC amplifier, the method of controlling exposure comprising the steps of:

a) controlling the iris diaphragm in accordance with an electric signal output from the preamplifier as an iris diaphragm detection signal;

b) controlling the gain of the AGC amplifier in accordance with an electric signal output from the AGC amplifier as an AGC detection signal;

c) determining the states of a photographing scene based on a change of the electric signal output from the preamplifier corresponding to an image of the subject over a lapse of time; and d) selectively increasing or decreasing the operating speed of the iris diaphragm and the AGC amplifier simultaneously in accordance with the determined states of the photographing scene, wherein said step c) comprises determining whether the photographing scene or the subject are in one of either a continuous state or a discontinuous state based on a change over the lapse of time of respective electric signals corresponding to at least two different areas including a central portion of the image of the subject, and said step (d) comprises simultaneously decreasing the respective operating speeds of the iris diaphragm and the AGC amplifier when it is determined that the photographing scene or the subject is in the continuous state, and simultaneously increasing the respective operating speeds of the iris diaphragm and the AGC amplifier when it is determined that the photographing scene or the subject is in the discontinuous state.

11. The method of controlling exposure of a video camera of claim 10, said step a) comprising:

determining an average value of the iris diaphragm detection signal over the lapse of time; and driving the iris diaphragm so that the average value of the iris diaphragm detection signal coincides with a preset iris diaphragm reference value.

12. The method of controlling exposure of a video camera of claim 11, said step b) comprising:

determining an average value of the AGC detection signal over the lapse of time; and controlling the gain of the AGC amplifier so that the average value of the AGC detection signal coincides with a preset AGC reference value.

13. The method of controlling exposure of a video camera of claim 12, wherein said step c) comprises determining whether one of a center-weighted measuring mode or an averaged light measuring mode is to be employed based on ratios of respective electric signals corresponding to at least two different areas including an area of a central portion of the image of the subject, and said step (d) comprises correcting the preset iris diaphragm reference value and the preset AGC reference value based on the electric signals corresponding to the area of the central portion when the center-weighted measuring mode is employed.

14. The method of controlling exposure of a video camera of claim 13, further comprising the steps of:

e) detecting a brightness of the subject; and f) decreasing a correction amount of a spot light of the imaged subject when the brightness of the subject detected is increased and decreasing a correction amount of a rear light of the imaged subject when the brightness of the subject is decreased.

15. The method of controlling exposure of a video camera of claim 10, wherein said step c) further comprises determining whether one of a center-weighted measuring mode or an averaged light measuring mode is to be employed based on a change over the lapse of time of the respective electric signals corresponding to the at least two different areas including the central portion of the image of the subject and determining whether the subject leaves or enters the central portion of the image when the center-weighted measuring mode is employed, and said step (d) further comprises simultaneously decreasing the respective operating speeds of the iris diaphragm and the AGC amplifier when it is determined that the subject leaves the central portion of the image in the center-weighted measuring mode and simultaneously increasing the respective operating speeds of the iris diaphragm and the AGC amplifier when it is determined that the subject enters the central portion of the image in the center-weighted measuring mode.

16. A method of controlling exposure of a video camera including an image sensor for imaging light from a subject incident upon the image sensor through a taking lens and an iris diaphragm, an electrical signal output from the image sensor being supplied to video processing means via a preamplifier and an AGC amplifier, the method of controlling exposure comprising the steps of:

a) controlling the iris diaphragm in accordance with an electric signal output from the preamplifier as an iris diaphragm detection signal;

b) controlling the gain of the AGC amplifier in accordance with an electric signal output from the AGC amplifier as an AGC detection signal;

c) determining the states of a photographing scene based on a change of the electric signal output from the preamplifier corresponding to an image of the subject over a lapse of time; and d) selectively increasing or decreasing the operating speed of the iris diaphragm and the AGC amplifier simultaneously in accordance with the determined states of the photographing scene, wherein said step c) comprises determining a change of variation of an evaluation value, indicative of a focusing state, obtained from an area of a central portion of the image of the subject, and said step (d) comprises simultaneously decreasing the respective operating speeds of the iris diaphragm and the AGC amplifier when the evaluation value is changed within a predetermined range and simultaneously increasing the respective operating speeds of the iris diaphragm and the AGC amplifier when the evaluation value is changed exceeding the predetermined value.

17. A method of controlling exposure of a video camera including an image sensor for imaging light from a subject incident upon the image sensor through a taking lens and an iris diaphragm, an electrical signal output from the image sensor being supplied to video processing means via a preamplifier and an AGC amplifier, the method of controlling exposure comprising the steps of:

a) controlling the iris diaphragm in accordance with an electric signal output from the preamplifier as an iris diaphragm detection signal;

b) controlling the gain of the AGC amplifier in accordance with an electric signal output from the AGC amplifier as an AGC detection signal;

c) determining the states of a photographing scene based on a change of the electric signal output from the preamplifier corresponding to an image of the subject over a lapse of time; and d) selectively increasing or decreasing the operating speed of the iris diaphragm and the AGC amplifier simultaneously in accordance with the determined states of the photographing scene, wherein said step c) comprises determining the change of size of the subject in the image, and said step (d) comprises simultaneously decreasing the respective operating speeds of the iris diaphragm and the AGC amplifier when the size of the subject is changed within a predetermined range and simultaneously increasing the respective operating speeds of the iris diaphragm and the AGC amplifier when the size of the subject is changed exceeding the predetermined range.

18. A method of controlling exposure of a video camera including an image sensor for imaging light from a subject incident upon the image sensor through a taking lens and an iris diaphragm, an electrical signal output from the image sensor being supplied to video processing means via a preamplifier and an AGC amplifier, the method of controlling exposure comprising the steps of:

a) controlling the iris diaphragm in accordance with an electric signal output from the preamplifier as an iris diaphragm detection signal;

b) controlling the gain of the AGC amplifier in accordance with an electric signal output from the AGC amplifier as an AGC detection signal;

c) determining the states of a photographing scene based on a change of the electric signal output from the preamplifier corresponding to an image of the subject over a lapse of time; and d) selectively increasing or decreasing the operating speed of the iris diaphragm and the AGC amplifier simultaneously in accordance with the determined states of the photographing scene, wherein said step c) comprises determining the state of change of a focusing distance of the taking lens, and said step (d) comprises simultaneously decreasing the respective operating speeds of the iris diaphragm and the AGC amplifier when it is determined that the focusing distance is changed within a predetermined range and simultaneously increasing the respective operating speeds of the iris diaphragm and the AGC amplifier when it is determined that the focusing distance is changed exceeding the predetermined range.

19. An exposure control apparatus for a video camera including an image sensor for imaging light from a subject incident upon the image sensor through a taking lens and an iris diaphragm, an electric signal output from the image sensor being supplied to video processing means via a preamplifier and an AGC amplifier, the exposure control apparatus comprising:

iris diaphragm control means, coupled to an electric signal output from said preamplifier as an iris diaphragm detection signal, for controlling the iris diaphragm in accordance with the iris diaphragm detection signal;

AGC control means, coupled to an electric signal output from the AGC amplifier as an AGC detection signal, for controlling gain of the AGC amplifier based on the AGC detection signal;

determination means, operatively coupled to the electric signal output from the preamplifier, for determining the degree of change of the subject within an imaged photographing scene over a predetermined period of time in accordance with electric signals corresponding to an image of the subject; and operating speed control means, coupled to said determination means, for simultaneously directing said iris diaphragm control means and said AGC control means to increase respective operating speeds of the iris diaphragm and the AGC amplifier when said determination means determines that the subject has changed and to decrease respective operating speeds of the iris diaphragm and the AGC amplifier when said determination means determines that the degree of change of the subject is indicative that the subject has not substantially changed.

20. The exposure control apparatus of a video camera of claim 19, wherein said iris diaphragm control means comprises:

integrating means for determining an average value of the iris diaphragm detection signal over the predetermined period of time; and iris diaphragm drive means for driving the iris diaphragm so that the average value of the iris diaphragm detection signal coincides with a preset iris diaphragm reference value.

21. The exposure control apparatus for a video camera of claim 21 wherein said AGC control means comprises:

integrating means for determining an average value of the AGC detection signal over the predetermined period of time; and AGC amplifier drive means for controlling the gain of the AGC amplifier so that the average value of the AGC detection signal coincides with a preset AGC reference value.

22. An exposure control apparatus for a video camera which generates a video signal by converting a light incident on an image sensor from a subject through a taking lens and an iris diaphragm to an electric signal and outputting the electric signal to a video processing circuit, through a preamplifier and an AGC amplifier, for processing the electric signal, the exposure control apparatus comprising:

first average value detecting means for determining a first average value of a first electric signal output from said preamplifier;

iris diaphragm means for driving said iris diaphragm so that said first average value coincides with a preset iris diaphragm reference value;

second average value detecting means for determining a second average value of a second electric signal output from said AGC amplifier;

gain control means for controlling a gain of said AGC amplifier so that said second average value coincides with a preset AGC reference value;

control means for determining whether one of a center-weighted measuring mode or an average light measuring mode is to be employed based on a ratio of a third electric signal corresponding to a center of an image of the subject and a fourth electric signal corresponding to a whole of the image of the subject and for outputting an exposure correction signal for correcting said preset iris diaphragm reference value and said preset AGC reference value based on said third electric signal when said center-weighted measuring mode is employed;

detection means for detecting a brightness of the subject; and restriction means for decreasing a correction amount of a spot light in said exposure correction signal when the brightness of the subject detected by said detection means is increased and for decreasing a correction amount of a rear light in said exposure correction signal when the brightness of the subject is decreased.

* * * * *